(12) United States Patent
Cadambi et al.

(10) Patent No.: US 8,583,896 B2
(45) Date of Patent: Nov. 12, 2013

(54) MASSIVELY PARALLEL PROCESSING CORE WITH PLURAL CHAINS OF PROCESSING ELEMENTS AND RESPECTIVE SMART MEMORY STORING SELECT DATA RECEIVED FROM EACH CHAIN

(75) Inventors: Srihari Cadambi, Princeton, NJ (US); Abhinandan Majumdar, Edison, NJ (US); Michela Becchi, Princeton, NJ (US); Srimat Chakradhar, Manalapan, NJ (US); Hans Peter Graf, Lincroft, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 627 days.

(21) Appl. No.: 12/843,579

(22) Filed: Jul. 26, 2010

(65) Prior Publication Data

US 2011/0119467 A1 May 19, 2011

Related U.S. Application Data

(60) Provisional application No. 61/261,006, filed on Nov. 13, 2009, provisional application No. 61/317,507, filed on Mar. 25, 2010.

(51) Int. Cl.
*G06F 15/80* (2006.01)

(52) U.S. Cl.
USPC .............................................. 712/27; 712/11

(58) Field of Classification Search
None
See application file for complete search history.

(56) References Cited

U.S. PATENT DOCUMENTS 5,719,642 A * 2/1998 Lee ................................ 348/699
6,513,018 B1 * 1/2003 Culhane .......................... 705/35

OTHER PUBLICATIONS

Burger, D. et al., "Scaling to the End of Silicon with EDGE Architectures", IEEE Computer Society, Jul. 2004, pp. 44-55.
Catanzaro, B. et al., "Fast Support Vector Machine Training and Classification on Graphics Processors", Proceedings of the 25th International Conference on Machine Learning, Helsinki, Finland, 2008, 8 pages.
Kapasi, U.J. et al., "Programmable Stream Processors", IEEE Computer Society, Aug. 2003, pp. 54-62.
Kelm, J.H. et al., "Rigel: An Architecture and Scalable Programming Interface for a 1000-core Accelerator", ISCA, Jun. 20-24, 2009, pp. 140-151.
Rousseaux, S. et al., "A High Performance FPGA-Based Accelerator for BLAS Library Implementation", Proceedings of the Third Annual Reconfigurable Systems Summer Institute, 2007, 10 pages.
Seiler, L. et al., "Larrabee: A Many-Core x86 Architecture For Visual Computing", IEEE Computer Society, Jan./Feb. 2009, pp. 10-21.
Zhou, L. et al., "High Performance Linear Algebra Operations on Reconfigurable Systems", Proceedings of the 2005 ACM/IEEEE SC/05 Conference, 2005, pp. 1-12.

* cited by examiner

*Primary Examiner* — Kenneth Kim
(74) *Attorney, Agent, or Firm* — Joseph Kolodka; James Bitetto

(57) ABSTRACT

Systems and methods for massively parallel processing on an accelerator that includes a plurality of processing cores. Each processing core includes multiple processing chains configured to perform parallel computations, each of which includes a plurality of interconnected processing elements. The cores further include multiple of smart memory blocks configured to store and process data, each memory block accepting the output of one of the plurality of processing chains. The cores communicate with at least one off-chip memory bank.

11 Claims, 7 Drawing Sheets

US 8,583,896 B2

MASSIVELY PARALLEL PROCESSING CORE WITH PLURAL CHAINS OF PROCESSING ELEMENTS AND RESPECTIVE SMART MEMORY STORING SELECT DATA RECEIVED FROM EACH CHAIN

RELATED APPLICATION INFORMATION

This application claims priority to provisional application Ser. No. 61/261,006 filed on Nov. 13, 2009, incorporated herein by reference. This application also claims priority to provisional application Ser. No. 61/317,507 filed on Mar. 25, 2010.

BACKGROUND

1. Technical Field

The present invention relates to parallel processing and, in particular, to systems and methods for massively parallel, smart-memory-based processing in accelerators for data analytics.

2. Description of the Related Art

Applications that examine raw, unstructured data in order to draw conclusions and make decisions are becoming ubiquitous. Banks and credit cards companies, for instance, analyze withdrawal and spending patterns to prevent fraud or identity theft. Online retailers study website traffic patterns in order to predict customer interest in products and services based upon prior purchases and viewing trends. Semantic querying of text and images, which has wide-ranging, mass market uses such as advertisement placement and content-based image retrieval, is another fast growing application domain.

As the volume of data increases, the performance constraints on these applications become more stringent. As an example, for semantic text search, a server using a learning algorithm such as Supervised Semantic Indexing must search millions of documents at a few milliseconds per query. Another example is face and object recognition in high resolution video that is often done with Convolutional Neural Networks (CNNs). A server performing this task must search VGA (640×480) or higher resolution images at rates of 24 or more frames per second. Often, economic considerations dictate that multiple video streams be processed simultaneously on one server.

SUMMARY

An accelerator system is shown that includes a plurality of processing cores. Each processing core includes a plurality of processing chains configured to perform parallel computations, each comprising a plurality of interconnected processing elements and a plurality of smart memory blocks configured to selectively store data based on an operation, each memory block accepting the output of one of the plurality of processing chains. The accelerator system further includes at least one off chip memory bank connected to each of the processing cores.

A method of processing for a multi-core accelerator system is shown that includes mapping a first matrix to a plurality of processing elements, streaming a second matrix to the plurality of processing elements to perform a matrix operation, and selectively storing output from the processing elements in a smart memory based on a comparison function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
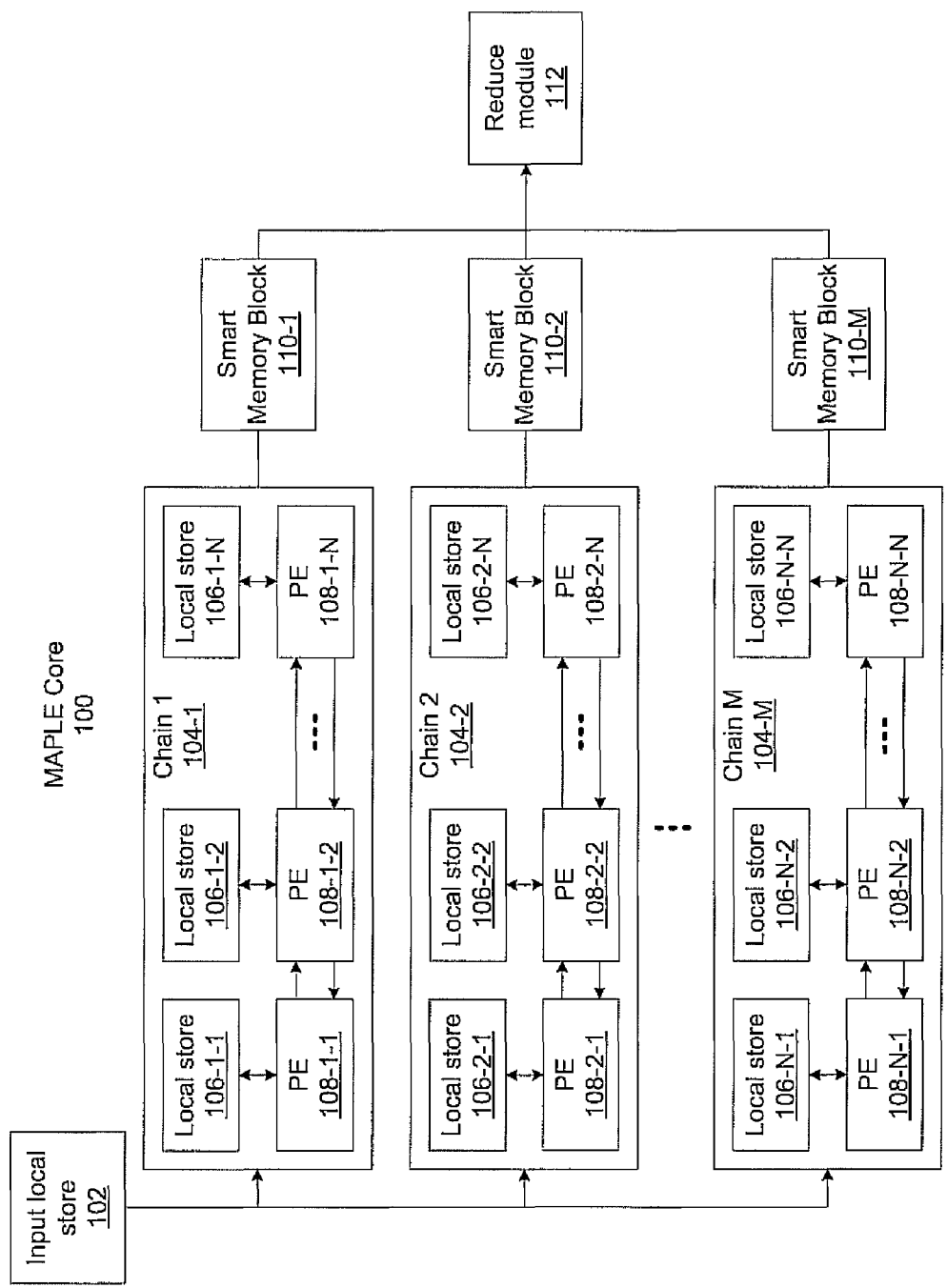
FIG. 1 shows a block diagram of a processing core having multiple processing chains and smart memory blocks.

The present principles provide a many-core accelerator system/method called MAPLE (Massively Parallel Learning/Classification Engine). MAPLE's processing core may have hundreds of simple vector processing elements (PEs). MAPLE uses "smart memory" that is capable of in-memory processing, such that large intermediate data is processed on-the-fly and off-chip memory accesses are reduced. MAPLE also uses banked off-chip memories, with each memory bank serving a separate group of processing elements (PEs), thereby creating processor-memory channels that can process the coarse-grained, independent computation streams.

In designing a parallel accelerator for learning and classification applications, five representative workloads are considered: Supervised Semantic Indexing, Convolutional Neural Networks, K-means, Support Vector Machines, and Generalized Learning Vector Quantization. The computational bottlenecks of these algorithms share two characteristics. First, they can be formulated as a matrix or vector operations, producing large amounts of intermediate data, which is then reduced by a secondary operation such as array ranking, finding minimums and maximums, and aggregation. The intermediate data involved many off-chip memory accesses. Second, the bottlenecks exhibit coarse-grained as well as fine-grained parallelism. In other words, the computations can be partitioned into parallel streams with little communication between them, each stream being processed by hundreds of parallel processing elements.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary design for a MAPLE processing core is shown. Each core 100 has p=N·M processing elements (PEs) 108. The PEs 108 are organized as M processing chains 104, having N PEs 108 each. Each chain 104 has a bi-directional, nearest neighbor interconnect between the PEs 108 along which inputs are propagated in one direction and outputs in the other. The first PE 108-N−1 in every chain accepts inputs from an input local store 102. In an alternative embodiment, each chain 104 has a separate input buffer 102, such that a stall in one chain would not affect the other chains.

Each PE 108 also has a private local store 106 which can be written with data from off-chip. A PE chain 104 sends its outputs to its respective smart memory block 110, which can perform in-memory processing such as array ranking, finding maxima and minima, and aggregation. Each PE 108 takes two vector operands as inputs, one from its local store 106 and the other streaming from the input buffer 102.

For example, a matrix multiplication can be implemented by first distributing columns of a constant matrix to all PE local stores 106. Then the rows of a second matrix are streamed across each PE chain 104, and the result is streamed into the smart memory blocks 110. The results are processed as they stream in, so the large intermediate result need not be stored in full.

The contents of the smart memory blocks 110 can be aggregated and written to off chip storage. This implements a "reduce network" 112, by which the data from a particular location in all M smart memory blocks 110 can be operated before writing off-chip. The reduce operation may include summation or finding minima or maxima.

Figure 2:
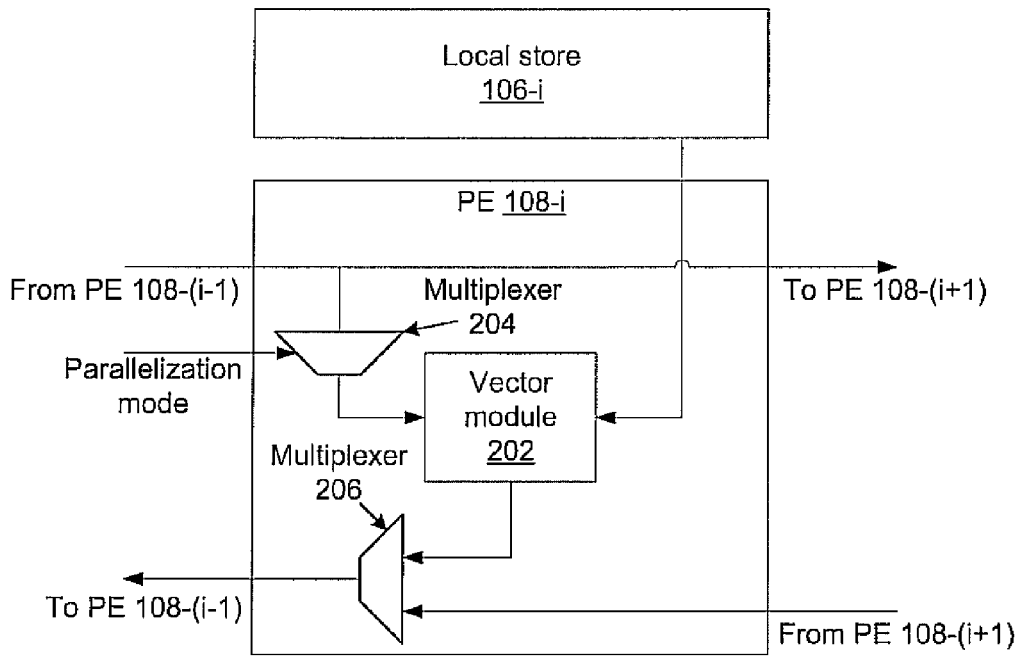
FIG. 2 shows a block diagram of an individual processing element.

Referring now to FIG. 2, the PEs 108 are shown in greater detail. Each PE 108 performs arithmetic logic unit (ALU) and multiply operations, as well as a multiple-accumulate operation in a single cycle. A PE 108 uses a vector processor 202 operating on streaming data. Each PE 108-i has two inputs, one from the PE 108-(i−1) on its left via the intra-chain interconnect, and the other from its private local store 106-i. The intra-chain interconnect bus is N words long and matches the number of PEs 108 in the chain 104. Thus, the PE chain 104 can perform up to N vector operations at a time. A PE 108 can select any word from its intra-chain connect bus, leading to different parallelization modes for the chain. The NPEs 108 in a chain can operate on N different streaming words as well as on the same word. A parallelization mode signal is fed to multiplexer 204 to control which word the vector module 202 receives from the intra-chain connection. The vector module 202 also receives data from the local store 106-i. Using the two inputs, the vector module 202 produces an output that is joined with the output interconnect from PE 108-(i+1) at a multiplexer 206.

The PEs 108 store outputs to their smart memory block via the intra-chain interconnect and can continue processing the next vector in the next cycle. For some embodiments, the PEs 108 may also store their output in their respective local stores 106. Unless the smart memory block 110 issues a stall, a store operation takes N cycles, as the outputs from each PE 108 arrive. This latency can be hidden by the next vector operation if the vector size is large enough. To facilitate indexing of results, a PE also sends an identification number along with the results to be stored.

Each chain 104 has an associated memory block 110 capable of two atomic store operations. The first is a variable latency store for selection and ranking operations in large arrays, and the second is a read-modify-write. The memory block can be written to by the processing chain 104 and is read by the reduce network 112.

Figure 3:
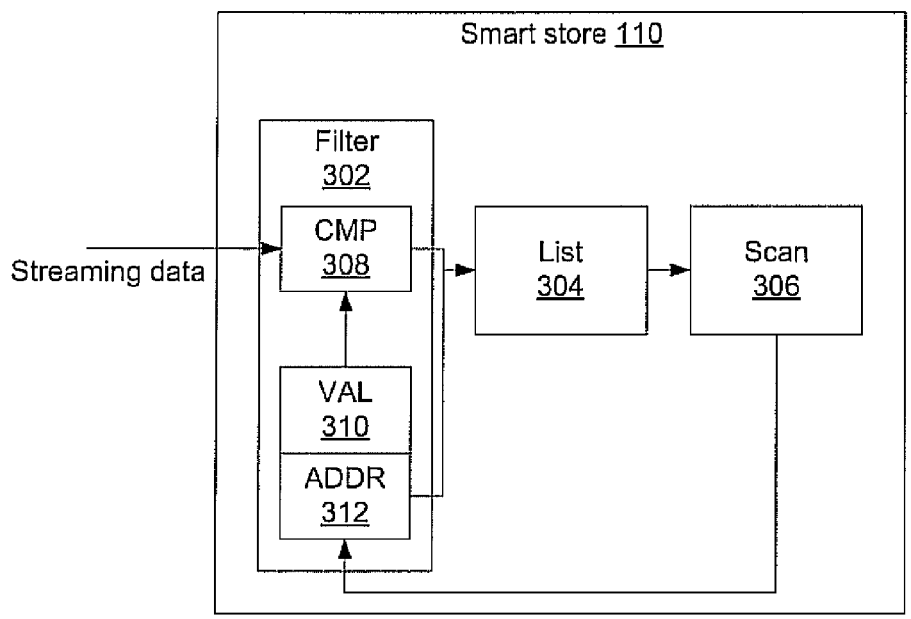
FIG. 3 shows a block diagram of a smart memory block.

Referring now to FIG. 3, a detailed illustration of smart storage 110 that selects the top k elements in an array, given a comparison function, is shown. The storage includes a logic component, shown illustratively as a filter 302. The logic component determines whether to store a given input and, if so, where in the memory to store it. In the example shown in FIG. 3, the filter 302 performs a comparison, but other operations are contemplated. The smart storage 110 further includes a list 304 to the array, and a list scanner 306. Array elements stream in from a chain 104 and are compared at comparator 308 with a threshold value 310. For example, the comparison module could use a maximization function, which would judge whether the array element is greater than the value stored in 310. If the comparison succeeds for an array element, that element is stored in list 304 at address 312, replacing value 310. The scanner 306 then scans list 304 to find a new threshold value and address and updates the filter 302. If the comparison fails, the element is discarded. When k is small compared to the size of the array, there are more discards than insertions. In the event of an insertion, the filter 302 issues a stall signal that stalls the processor in order to scan the list 304 and update the filter 302.

Figure 4:
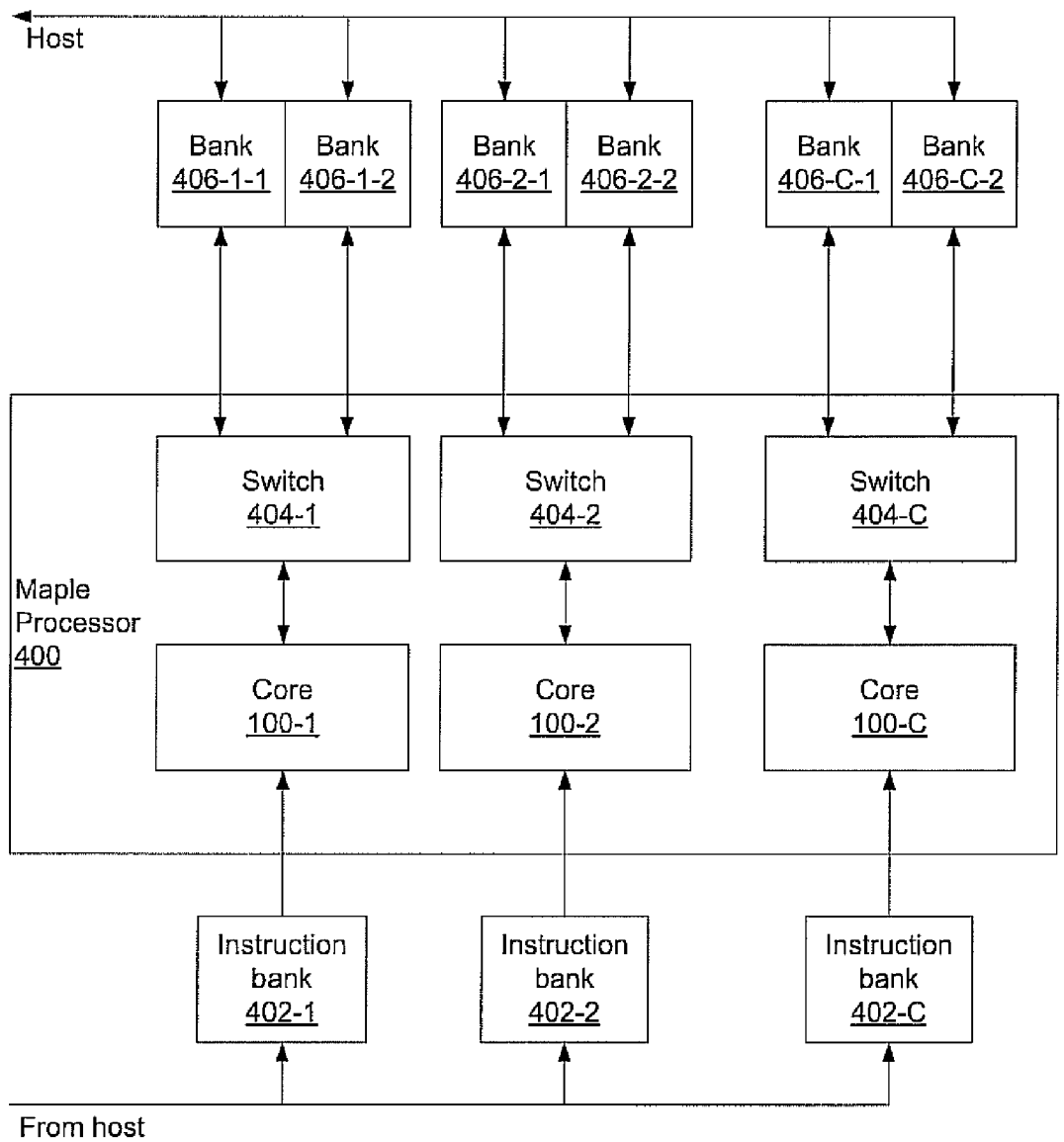
FIG. 4 shows a block diagram of a Massively Parallel Learning/Classification Engine (MAPLE) accelerator having multiple cores.

Referring now to FIG. 4, an overall MAPLE accelerator 400 is shown, comprising C processing cores 100. The processor 400 is connected to a general-purpose host via a communication interface such as PCI. A high-bandwidth bus connects each core 100 to an off chip instruction memory bank 402. After processing, the each core 100 communicates with one of two off-chip memory banks 406. A switch 404 allows each core 100 to alternate between its memory banks 406 for inputs and outputs, or use both banks as inputs or as outputs. If more than two memory banks 406 are used for each core 100, the switch may rotate between them. Additionally, the banks may all be inputs, all be outputs, or they may be some combination of inputs and outputs.

Each core 100 also has its own separate instruction memory bank 402 that is written by the host. The host can also write to the memory banks 406 via a bank-to-bank interconnection network, which may be of lower bandwidth than the cores' communication interface. The architecture is tailored to applications that can be parallelized into separate memory-processor core "channels," with infrequent communications across the channels. The memory architecture allows easy scalability by increasing the number of banks 406 without the need for coalescing accesses.

Figure 5:
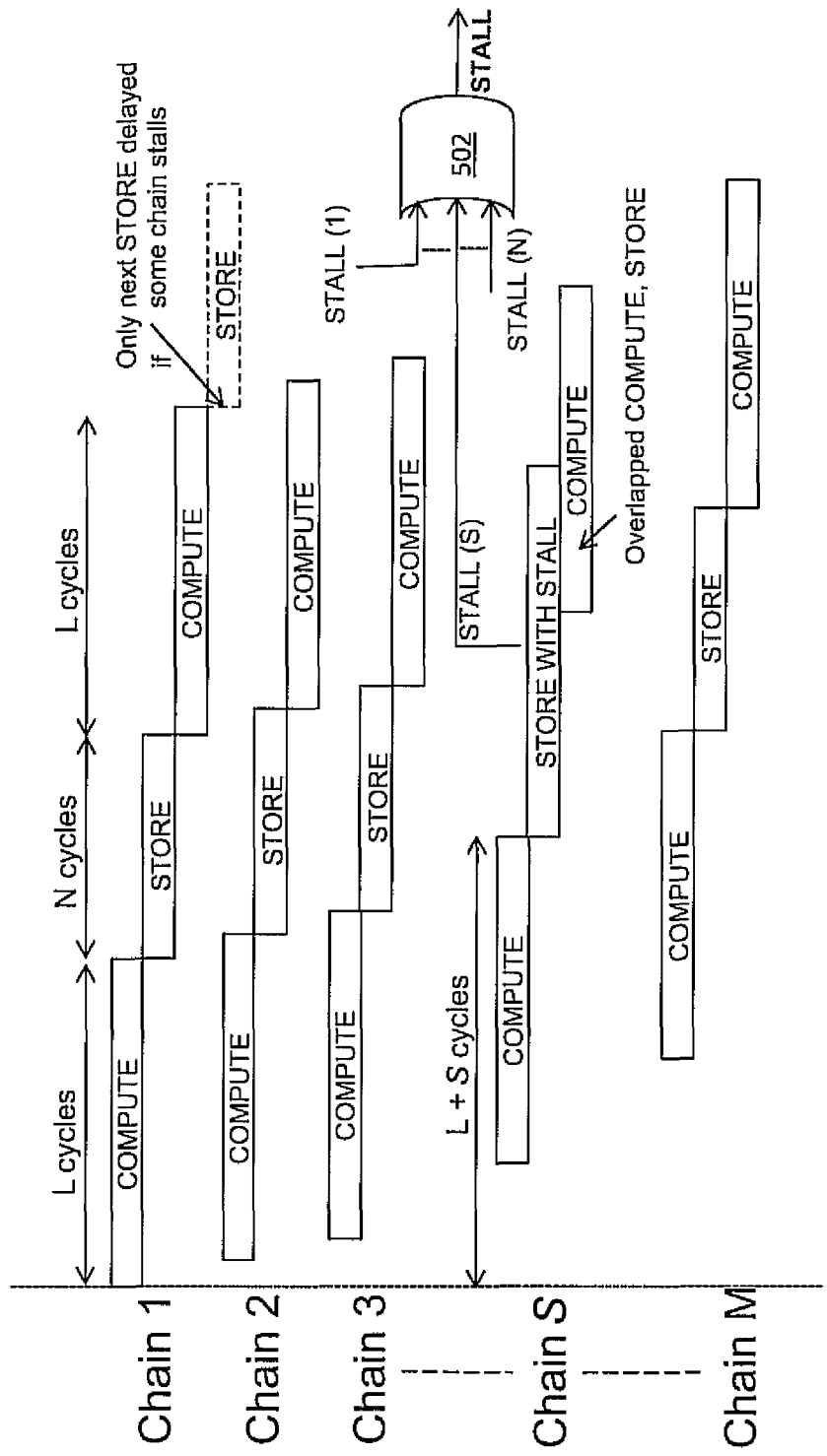
FIG. 5 shows a diagram of the operation of the stall signal.

As noted above, storing data in the smart memory blocks 110 can take many cycles. Referring now to FIG. 5, a stall mechanism is shown. FIG. 5 shows the M chains 104 of a MAPLE core. Each chain has a COMPUTE phase that lasts for L cycles, where L is the operand vector size. The COMPUTE phase is followed by a STORE phase where the outputs of the NPEs 108 in the chain 104 are collected and stored in the memory block. Successive chains are separated by one cycle due to pipelining. If a chain S incurs a stall, it can continue computing the next result but does not store its results until the stall resolves. Other chains can also continue computing during a stall, but these chains also wait to store their results. In other words, input streams that are already being processed are not interrupted by the stall. If the vector size L is larger than the number of cycles for the stall, then the latency caused by the stall is effectively hidden. When multiple chains stall, the stall cycles can be overlapped, thereby reducing the overall stall penalty.

The smart memory 110 triggers a stall when it uses a variable latency store, such as that shown above in FIG. 3. However, not all actions of the smart memory 110 produce a stall. If the smart memory 110 performs a read-modify-write operation, no stall is incurred. Further, if the smart memory's filter 302 discards an element (e.g., if the comparison fails), this does not incur a stall. The length of the stall depends on the size of the data to be stored. For example, if the list has a size Z, the stall will last for Z cycles.

The OR gate 502 in FIG. 5 broadcasts a global STALL signal generated from the individual chains. This signal can be pipelined, since it only has to stall the next input vector and can therefore reach the first chain as its current COMPUTE cycle completes. The global stall is used because all of the chains process a common pipelined input that streams from the input local store. If one chain stalls, its input must be stalled—then all of the chains are stalled in order to preserve the order of processing. As an alternative embodiment, each chain may have a separate input buffer 102.

For the purposes of analyzing the stall probability and penalty for the average case, each memory block is assumed to need to extract the top k elements from an array of size n. Since each memory block corresponds to one of M processing chains, M arrays can process in parallel. If $P_{stall}(i)$ is the probability of stalling when storing the i'th element of the array, and $C_{stall}$ and $C_{nostall}$ represent the number of cycles for a stalled and non-stalled store respectively, the number of cycles TC for processing M n-element arrays is:

$$TC = \sum_{i=1}^{n} P_{stall}(i) \cdot C_{stall} + (1 - P_{stall}(i)) \cdot C_{nostall}$$

The core stalls when any of its M chains stall. Therefore, if $P_{chain-stall}(i, j)$ is the probability of chain j stalling while storing element i:

$$P_{stall}(i) = \max\left[1, \sum_{j=1}^{H} P_{chain-stall}(i, j)\right]$$

A chain with N processors stores N words during its store phase. The chain stalls if any of the N stores stall. Since the n-element array is streaming, when element i is stored, the probability that element i will be in the top k is $\lceil k/i \rceil$. Therefore:

$$P_{chain-stall}(i, j) = \max\left[1, \sum_{i=1}^{M} \lceil k/i + l \rceil\right]$$

This implies that, for small i, stalls will be frequent, but will taper off as more elements of the array are processed. Even though the stall probability is not small (for e.g., around 10% for the first 1M elements of a 4M element array when selecting 512 elements), MAPLE's performance is largely insensitive to the number of elements being selected. This is because the stall cycles are effectively hidden by overlapping them with the C compute cycles of the next array element. Thus, MAPLE can use the memory blocks to compute array selection efficiently.

In order to program MAPLE, a user can express an application in terms of matrix multiplications and an aggregation/reduction function. At a low level, MAPLE is programmed through a specialized assembly. In order to free the programmer from the need for dealing with low level mapping and programming issues, using the input matrixes and the aggregation function it is possible to: (i) produce a mapping of data to input- and PE-local stores, (ii) configure the data-paths to the smart memory blocks, and (iii) automatically generate the assembly used to program MAPLE.

Figure 6:
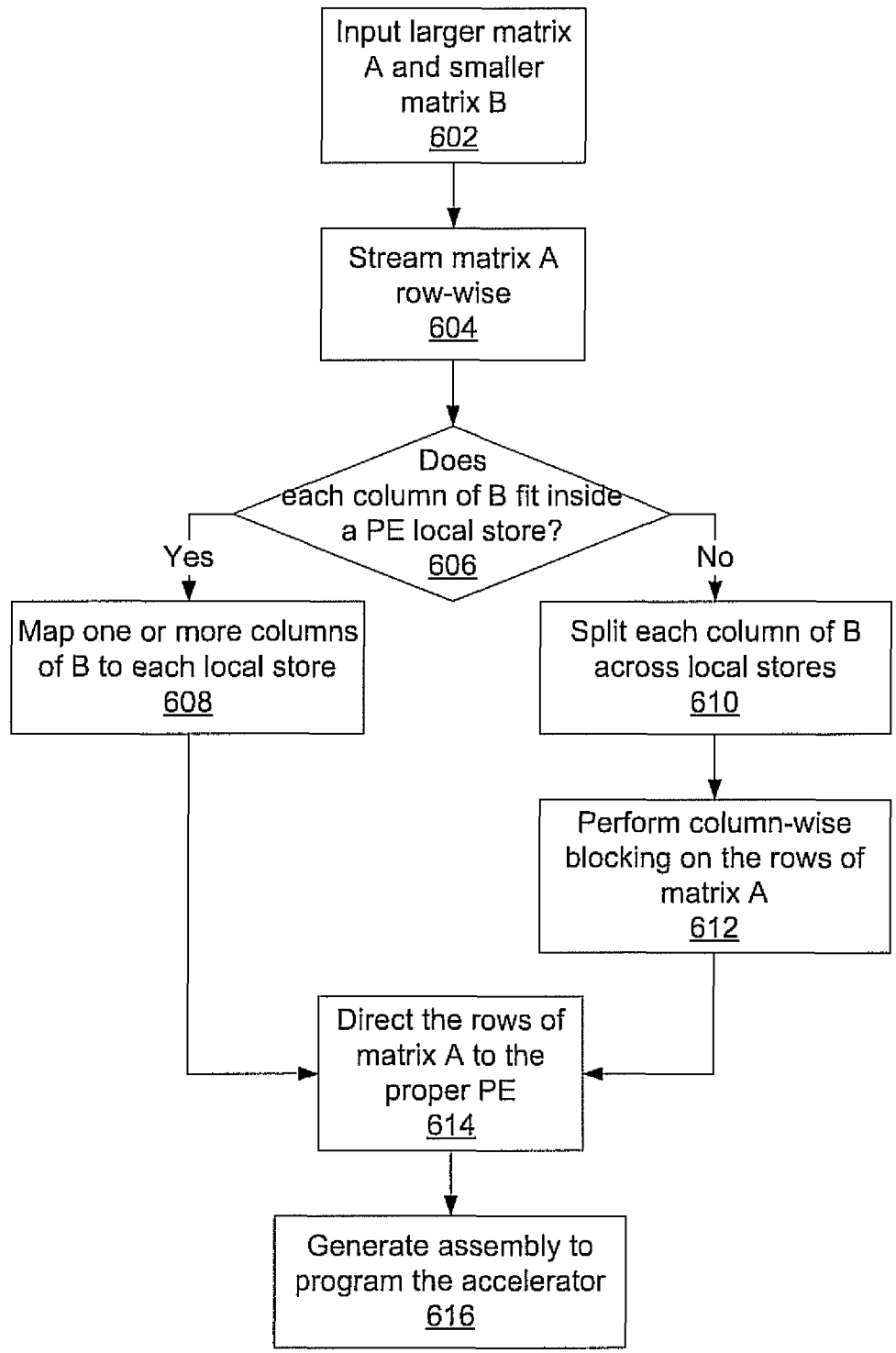
FIG. 6 shows a block/flow diagram that describes a process for compiling a matrix operation on a MAPLE accelerator.

For the sake of explanation, FIG. 6 exemplifies the process of mapping two matrixes for multiplication on the accelerator. The matrices are input at block 602. The mapping is based on the following idea: a larger matrix (A) will be streamed from the input local store, whereas a smaller matrix (B) will be mapped onto the PE local stores. Matrix A is streamed row-wise at block 604; if matrix A is too large to fit the input local store, row-wise blocking will be performed (and matrix A will be loaded into the input local store in multiple passes).

The mapping of matrix B is more complex. Each local store will potentially accommodate one or more columns of matrix B. It is determined at block 606 whether a column of matrix B will be small enough to fit in a local store. If matrix 13 is small, the same column will be mapped onto different PEs 108 at block 608, leading to parallel processing (parallelism made>1). In this case, during execution, PEs 108 configured with the same column will process different rows of matrix A concurrently. If the columns of B are too large to fit in a single PE local store 106, then they are split over multiple PEs 108 (parallelism mode<1) at block 610. During operation, the rows of matrix A will be split as well in block 612 and the data will be directed to the proper PE 108 at block 614. If matrix B cannot fit the PE local stores 106, column-wise blocking is performed to split it across local stores. The output of the mapping process is a mapping of matrixes to input and PE local stores 106 as well as a set of parameters used to automatically generate assembly to program the accelerator in block 616.

The pseudo-code below exemplifies the assembly code generation phase. In particular, all-caps keywords represent the generated assembly directives, whereas other keywords represent configuration variables provided by the user or parameters produced by the mapping process summarized above.

In the pseudo-code below, A_blocks and B_blocks are (row-wise and column-wise) portions of A and B matrixes fitting the input- and the PE-local stores 102 and 106, respectively. For the sake of simplicity, the code assumes that partial results computed on A-blocks fit the smart memory 110. The SET_PARALLEL_MODE assembly instruction has two effects. First, it affects the way matrix B is mapped onto the PE local stores, potentially leading to column replication (parallelism mode greater than 1) or splitting (parallelism mode less than 1). Second, it affects the way contiguous PEs 108 write to the smart memory blocks 110. If parallelism mode is greater than 1, PEs 108 programmed with the same B columns will write different rows of the output matrix. If parallelism mode is less than 1, then PEs 108 operating on different portions of the same B column will accumulate their partial results on the same address of the smart memory 110. The SET_SM_ADDR primitive instructs the first PE of each chain 104: the remaining PEs get automatically configured depending on the value of the parallelism mode parameter.

one partition executes, the other partition communicates data with the host. A dynamic scheme can be used to determine the chunk size: the chunk size is optimal when the transfer time and execution time are balanced and neither the host nor the accelerator waits for the other.

MAPLE may be programmed using a high level API that has general functions as well as algorithm-specific libraries. All parallelization and synchronization issues may be hidden from the user within the libraries, which are implemented at the assembly level. There are five classes of instructions for MAPLE: 1. Off chip to Input Local Store; 2. Off chip to PE Local Store; 3. On-chip Smart-Memory Blocks to Off-chip; 4. Input Local Store to Processing Elements; and 5. PE Instructions.

Off-chip to Input Local Store instructions are used to program MAPLE's memory controllers that move data from the

```
SET_PARALLEL_MODE parallelism_mode          ; sets the parallelism mode
SET_SM_REDUCTION smart_mem_reduction        ; configures the reduction
                                              performed by smart memories
SET_A_NUM_ROWS a_num_rows                   ; sets number of A rows present in
                                              each A_block
SET_B_COL_SZ b_col_size                     ; sets the size of the portion of B
                                              column fitting a PE local store
SET_B_NUM_COLS b_num_cols                   ; sets the number of B columns
                                              stored in each PE local store
for each A_block{                           ; A_blocks consist of A rows
    WRITE_A A_block                         ; transfers an A_block from
                                              DRAM into input local store
        for each B_block{                   ; B_blocks consist of B columns
        WRITE_B B_block                     ; transfers a B_block from DRAM
                                              into input local store
        SET_INPUT_LS_ADDR 0                 ; resets the active address in input
                                              local store
        for each A_row_group{               ; A_row_group consists of A rows
                                              processed concurrently
        for b_col: 0..b_num_cols{
            SET_PE_LS_ADDR b_col*b_col_size ; sets the address in PE_mem to
                                              load the B data from
            SET_SM_ADDR result_addr         ; sets the address in smart memory
                                              for partial results
            MULT_ACC_DUMP b_col_size        ; performs b_col_size MACC and
                                              sends result to smart mem
            STALL num_pe_per_chain          ; stalls
        }
            INC_INPUT_LS_ADDR sz (A_row_group) ; increments the address in input
                                                 local store to read from
    }
    DUMP_SM                                 ; dumps the content of smart
                                              memory after performing
                                              reduction
}
```

A kernel that runs on MAPLE is described as a function of two data operands, A and B. MAPLE may have C independent processor-memory channels, corresponding to the C processing cores shown in FIG. 4, each with $S_{off}$ bytes of off-chip memory and $S_{on}$ bytes of on-chip memory. In one embodiment, A is assigned to the off chip memory and B is assigned to the on-chip memory through analysis described earlier. The following addresses the case when A and 13 are larger than their respective memories, that is, size(A)>C.$S_{off}$ and size(B)>C.$S_{on}$.

To execute such workloads on MAPLE, host-to-MAPLE communication may be overlapped with MAPLE's execution. Specifically, the C processor-memory channels may be partitioned into two groups of C/2 channels each. Then A and B are divided into in and n chunks: A={$A_1, A_2, \ldots, A_m$} and B={$B_1, B_2, \ldots, B_n$}, thereby splitting the entire operation AB into inn smaller operations.

The chunks are divided such that each chunk $A_i$ and $B_i$ fits within the of and on-chip memories of a C/2 partition. When off chip memory banks 406 to the on-chip input local store 102. They allow the user to initiate a burst fetch to efficiently stride and step through off chip memory data 406 at the rate of one memory clock per fetch width. This hides off chip memory latency.

Off-chip to PE Local Store instructions program MAPLE's memory controllers to fetch arbitrary data from off-chip into a specific location of a particular PE's local store 106. Such data placement can schedule operations on different PEs 108 thereby extracting parallelism.

The On-chip Smart-Memory Blocks to Off-chip instructions program the reduce network 112 in MAPLE to collect data from various smart memory blocks, operate on those data, and store them off-chip. The reduce operations can be, for example, aggregations or comparisons.

Input Local Store to Processing Elements instructions specify data access patterns from input local stores 102 into the processing fabric. The input local store access can also be programmed to skip and stride across data so that access latency is hidden and the processing fabric is never kept waiting for data. All local stores on MAPLE may be software manages and operations such as data eviction are explicitly specified by instructions.

PE instructions instruct a PE 108 to load data (from its local store 106), compute (which implicitly starts a stream from the input local store 102), and store results in the smart memory block 110. Stores from PEs 108 also indicate what operation the smart memory block 110 performs, such as ranking or read-modify-write.

In addition to the above instructions, MAPLE's API functions allow users to allocate space in the off-chip memory from the host, transfer data and programs between the host and MAPLE, set MAPLE's program pointer, and send control signals to MAPLE that run specific programs or poll completion.

Various data analytics algorithms can be implemented on a MAPLE architecture to take advantage of MAPLE's parallel design. For example, supervised semantic indexing (SSI) is used to rank documents based on their semantic similarity to text-based queries. Each document and query is represented by a D-long vector, where D is the dictionary size. Each vector element is the product of Term Frequency (TF) and Inverse Document Frequency (IDF). TF is the number of occurrences of the word in the document, while IDF depends inversely on the number of documents the word occurs in. The vectors are sparse since the number of distinct words in a document smaller than the dictionary size. By multiplying a query or document sparse vector with W, a weight matrix generated by training, a dense, smaller vector is obtained which contains relevant information for document-query matching. The matching process then multiplies the query vector with all document vectors and identifies the documents whose vectors produced the top few results. For millions of documents, these computations take up 99% of the SSI execution time.

The core computation of SSI is to multiply (dot-product) a compacted query vector with all compacted document vectors and identify k documents with the highest dot-products. The document vectors can be expressed as a single matrix with S rows and C columns where S is the number of searchable documents, and C is the number of "concepts" along which similarity has to be identified. Each processor chain 104 in MAPLE is programmed to evaluate one query, which is loaded into the PE local stores 106. The chain's N processors compute the distance between the query and N documents in SIMD mode. All document vectors are stored in off-chip memory packed so that every memory read streams in N different documents, which are sent to the N processors in the chain 104. At the end of the stream, N dot-products computed by the chain 104 are written to its smart memory block 110 which maintains a list of the top k dot-products and their corresponding documents IDs. Multiple queries are handled by assigning one query to each of M chains in a MAPLE core 100; each chain 104 processes the same N document streams obviating the need for additional memory fetches.

Convolutional neural networks (CNNs) are 2-dimensional neural networks used for pattern recognition. A CNN uses small 2-D arrays of learned weights ("kernels") that are convolved with input images to produce output images. Output image $O_i$ obtained by convolving 17 inputs with n kernels is given by $$O_i = \tanh\left(bias + \sum_{j=1}^{n} I_j \cdot K_{ji}\right)$$

where $I_j \cdot K_{ji}$ represents the convolution operation between image $I_j$ and kernel $K_{ji}$. $O_i$ may be sub-sampled afterwards. All this constitutes one of several "layers" of a CNN. After processing an input image across several layers, features being searched for in the input are extracted. CNNs are used in object and face detection, and recently even in non-video applications like semantic text search.

CNN classification uses 1D or 2D convolutions followed by arithmetic operations and sub-sampling. The core computation in one layer is the convolution of $I_n$ input images with $L_n$ kernels and their pixel-wise summation to produce one output image. This is repeated for $O_n$ output images, each with the same $I_n$ inputs but a different set of weights. MAPLE's support for data access patterns allows convolutions to be expressed as matrix operations. The operations amount to repeated matrix-matrix multiplications $\{A\} \times \{B\} = \{C\}$ where $\{A\}$, $\{B\}$ and $\{C\}$ are sets of input, kernel and output matrices. MAPLE's memory and input local store controllers can be programmed for these data access patterns. Since the kernels are small and do not change, one can place kernel data in the PE private local stores 106, stream in the input matrix, and stream out the output matrix. Then each matrix-matrix operation A×B is parallelized along the columns of B: a MAPLE PE 108 computes one element in the final matrix.

Figure 7:
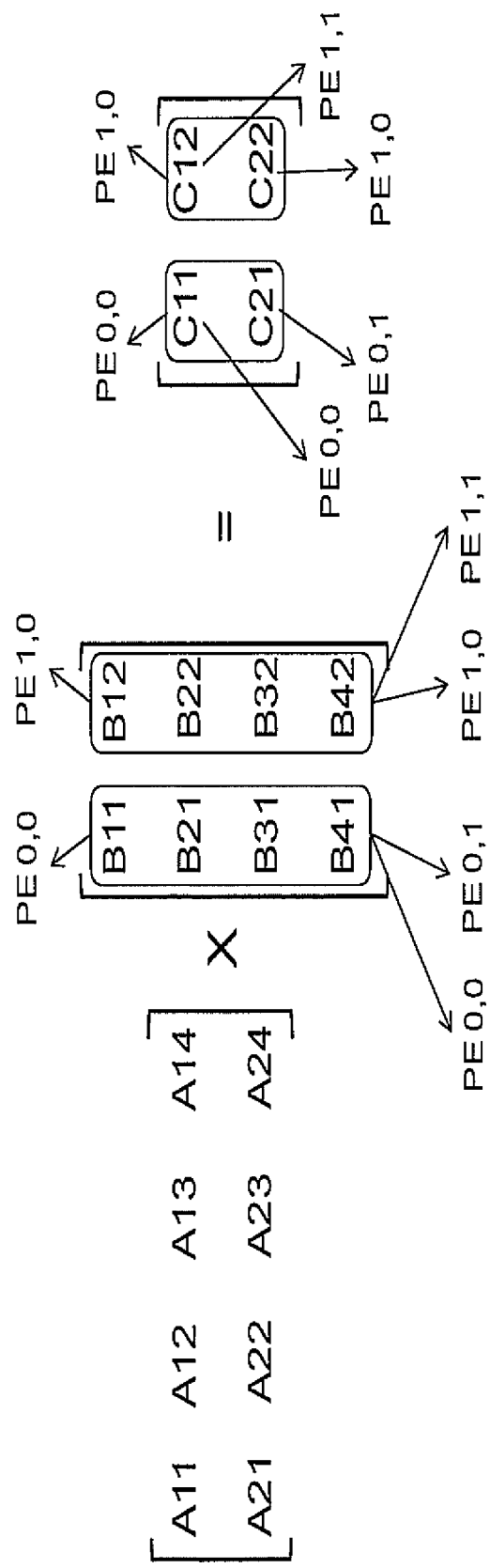
FIG. 7 shows an exemplary matrix multiplication across multiple processing elements.

Referring now to FIG. 7, one method of parallelization is shown, where each column of matrix B is loaded into the local stores of PEs (0,0) and (1,0) (i.e., the first PEs in chains 0 and 1). The image rows are streamed in one by one and broadcast to the two chains, resulting in PE (0,0) computing column 0, and PE (1,0) computing column 1 of the output. Another schedule is shown in the bottom of the figure where columns 0 and 1 of matrix B are duplicated in 2 PE local stores 106 in each chain 104. Both rows are streamed in together; therefore all four output elements are computed simultaneously, making it twice as fast. Thus, if the number of columns of matrix B is smaller than the number of PEs 108, the PEs 108 can be kept busy by column duplication and streaming multiple input rows.

Figure 8A:
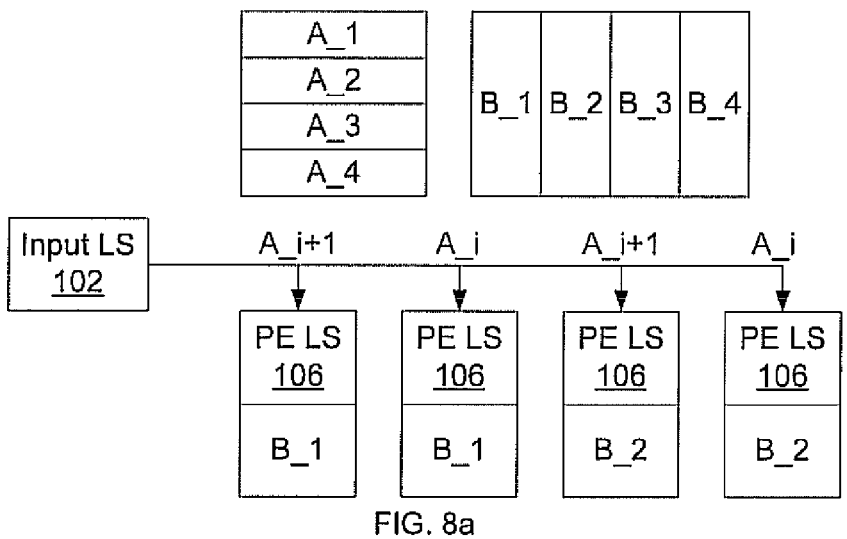
FIG. 8a shows mappings of matrices to processing elements with a parallelization mode of 2.
Figure 8B:
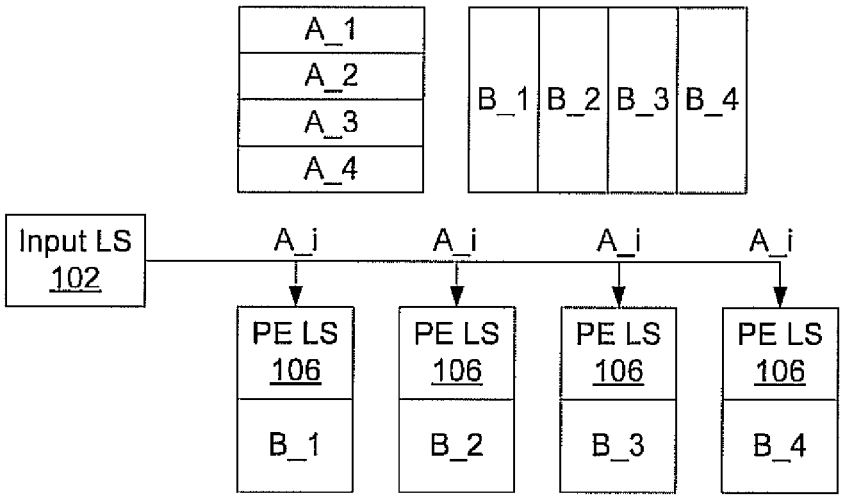
FIG. 8b shows mappings of matrices to processing elements with a parallelization mode of 1.
Figure 8C:
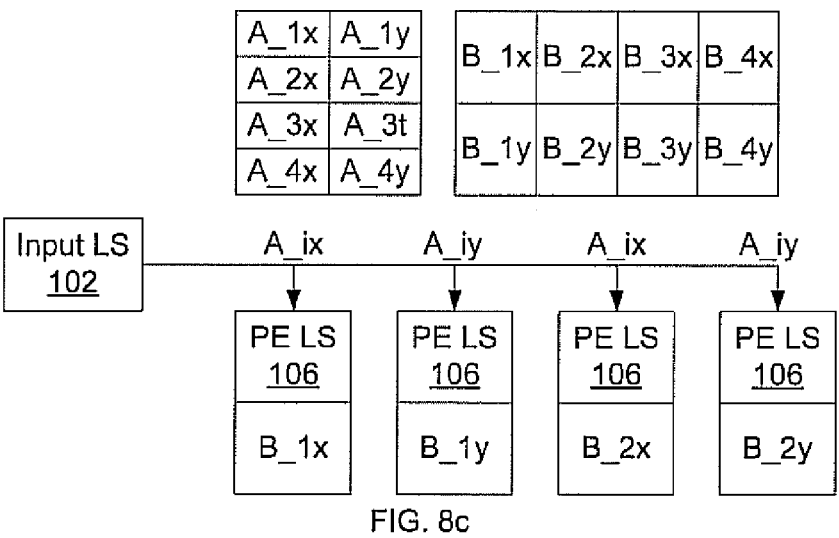
FIG. 8c shows mappings of matrices to processing elements with a parallelization mode of ½.

Referring now to FIGS. 8a-8c, three different parallelization modes are shown for mapping matrices to processing element local stores 106. In FIG. 8a, the column data from matrix B is replicated on a plurality of processing elements. Two elements of matrix A then stream from the input local store 102 to the processing elements at the same time, resulting in a parallelization mode of 2. The accelerator can in this fashion works through the elements of matrix A at double-speed. The parallelization mode may be as high as the number of processing elements (in the case of a single-column matrix B).

FIG. 8b illustrates a parallelization mode of 1, wherein each column of B is represented once in the processing elements and a single element of A is streamed at a time. FIG. 8b shows a parallelization mode of ½, where the columns of B are split into fractional portions and stored across multiple PEs. The input matrix is split as well before streaming to the appropriate PE. In the case of split columns, the smart memory 110 will accumulate results from the PEs processing a column before performing its reduction operation. As such, the parallelization modes affect data placement in the PE local stores 106, data distribution from the input local stores to the PEs 108, and smart memory 110 configuration.

The present principles can be used to accelerate a wide variety of algorithms. For example, the K-means algorithm is used to cluster n points into k clusters. It is commonly used in computer vision to perform image segmentation. Given a set of n points each of dimension d, the algorithm randomly selects k points as the first set of means, and computes the distance between each point and each of the k means. Then, for each mean $M_i 1$, $\leq i \leq k$, the algorithm computes the average of all points for which the closest mean is $M_i$. This is the new value for $M_i$ for the next iteration. The K-means algorithm proceeds until the means no longer change. The distance computation comprises more than 96% of the run-time.

In K-means, MAPLE computes Euclidean distances between k-means and all points, and finds the closest mean to each point. Each PE 108 computes the distance between a mean and a stream of points. The k means, each one represented by a vector, are loaded into the PE local stores 106, and the points are streamed through the PEs 108. The PEs 108 write Euclidean distances to the smart memory block 110, which stores them along with the point's ID obtained since the PE sends its locator ID along with its result. The reduce network 112 then reads the points one by one and discovers the mean that is closest to each point. Given the closest means to each of the n points, the host computes the next set of k means for the subsequent iteration.

Support Vector Machines (SVMs) is another classification algorithm. Given n vectors $x_i$, $i \in \{1, \ldots, n\}$ of training data each with dimension d and corresponding label $y_i$, the algorithm finds a subset of the training vectors (i.e., the support vectors) that effectively separate the data into distinct classes indicated by the labels. The algorithm is based on gradient descent and proceeds iteratively; two training vectors are selected during an iteration and multiplied with all other training vectors. The results are used to update the gradients, based on which two new training vectors are selected for the next iteration. The process terminates when the gradients stabilize at which point the support vectors are available. Given these support vectors, SVM classification uses a similar process to classify test vectors. The multiplication of each test or training vector with the training or support vector matrix constitutes around 85-95% of the overall run-time of SVM.

In SVM training and classification, the "kernel calculation" which involves the multiplication of test or training vectors with the large training or support vector matrix is the performance bottleneck. This is a vector-matrix multiplication where the matrix is very large and must reside off-chip. This computation can be performed on MAPLE by transferring the training or test vectors directly from the host to the PE local stores 106 and streaming in the matrix from off-chip. SVM training is a memory-bound problem: if the memory bandwidth allows fetching R elements of the matrix in one cycle, no more than 2R PEs 108 can execute in parallel since at most 2 vectors are given to multiply the matrix with in an iteration. In one example, with 512 PEs 108 and 4 memory banks 406, each able to fetch 8 words in one cycle, no more than 64 PEs 108 would be active at any given time. SVM testing on the other hand can load many more test vectors and multiply them all in parallel with the matrix.

Generalized Learning Vector Quantization (GLVQ) is a supervised learning algorithm that classifies an input into one of several classes. Each class is represented by several reference vectors produced by prior training. GLVQ classification computes the distance between an input vector and each reference vector, and classifies the input as belonging to the closest reference vector's class.

GLVQ classification involves finding the closest reference vector to the given query vector. All reference vectors are loaded on the PE local stores 106, and the queries streamed from off-chip one by one. Each PE 108 writes its result to the smart memory block 110, along with a "PE locator", and the reduce network 112 computes which PE 108 computed the lowest value, and therefore holds the closest reference vector.

Each of the above-discussed exemplary algorithms (SSI, CNN, K-means, SVM, and GVLQ) benefits greatly from implementation on MAPLE. Applications such as these, which operate on large amounts of unstructured data and have stringent performance constraints, scale poorly with data size. The present principles provide methods and systems for parallel acceleration that lead to substantial improvements in the efficiency of at least the above algorithms. In contrast to algorithm-specific accelerators, the present principles provide for acceleration that can be programmed to execute different learning and classification algorithms.

Having described preferred embodiments of a system and method for massively parallel, smart memory based acceleration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An accelerator system, comprising:
a plurality of processing cores, each processing core comprising:
a plurality of processing chains configured to perform parallel computations, each comprising a plurality of interconnected processing elements; and
a plurality of smart memory blocks configured to selectively store data based on an operation, each memory block accepting the output of one of the plurality of processing chains, wherein each smart memory block comprises:
a memory configured to store data elements; and
a filter configured to compare input data elements to a threshold and to store those elements in the memory only if the elements meet the threshold; and
at least one off-chip memory bank connected to each of the processing cores.

2. The accelerator system of claim 1, wherein the smart memory blocks further comprise a scanner configured to scan the memory to determine a new threshold and further configured to update the filter with said new threshold.

3. The accelerator system of claim 1, wherein each processing core is connected to a plurality of off-chip memory banks via a switch, wherein the switch is configured to rotate accesses between the memory banks.

4. The accelerator system of claim 1, wherein the smart memory blocks are configured to issue a stall signal that halts input to the processing chain when a new element is added to the memory.

5. The accelerator system of claim 4, wherein the stall signal is configured to delay storage of data but to allow the chain to continue computation.

6. The accelerator system of claim 4, wherein the stall signal is a global stall signal that halts input to all of the processing chains.

7. The accelerator system of claim 1, wherein the processing elements in each processing chain are arranged with a bi-directional, nearest neighbor interconnect that is configured to propagate inputs in one direction and outputs in the other.

8. The accelerator system of claim 1, wherein the off-chip memory banks share an interconnection bus configured to allow communication between processor cores.

9. The accelerator system of claim 1, wherein the processing cores further comprise an input store that receives input data from a host and passes said input data to the processing chains.

10. The accelerator system of claim 9, wherein each processing chain is connected to a different input store.

11. The accelerator system of claim 9, wherein the processing elements are arranged into a first and a second partition wherein one partition computes while the other partition concurrently communicates with the host.

* * * * *